(12) United States Patent
Simonis et al.

(10) Patent No.: US 11,298,923 B2
(45) Date of Patent: Apr. 12, 2022

(54) EDIFICE SEALING WEB, AND PROCESS FOR MANUFACTURING SAME

(71) Applicant: BMI Steildach GmbH, Oberusel (DE)

(72) Inventors: Udo Simonis, Ronneburg (DE); Johannes Glück, Hammelburg (DE)

(73) Assignee: BMI Steildach GmbH

( * ) Notice: Subject to any disclaimer, the term of this patent is extended or adjusted under 35 U.S.C. 154(b) by 0 days.

(21) Appl. No.: 16/756,897

(22) PCT Filed: Oct. 19, 2018

(86) PCT No.: PCT/EP2018/078709
§ 371 (c)(1),
(2) Date: Apr. 17, 2020

(87) PCT Pub. No.: WO2019/077107
PCT Pub. Date: Apr. 25, 2019

(65) Prior Publication Data
US 2021/0031497 A1    Feb. 4, 2021

(30) Foreign Application Priority Data

Oct. 20, 2017   (DE) .................... 10 2017 124 619.3

(51) Int. Cl.
| | |
|---|---|
| *D06N 7/04* | (2006.01) |
| *B32B 27/08* | (2006.01) |
| *B32B 7/12* | (2006.01) |
| *B32B 27/18* | (2006.01) |
| *B32B 27/30* | (2006.01) |

(Continued)

(52) U.S. Cl.
CPC ............. *B32B 27/08* (2013.01); *B32B 7/12* (2013.01); *B32B 27/18* (2013.01); *B32B 27/304* (2013.01); *B32B 27/32* (2013.01); *B32B 27/34* (2013.01); *B32B 37/04* (2013.01); *E04B 1/665* (2013.01); *E04D 5/10* (2013.01); *B32B 2270/00* (2013.01);

(Continued)

(58) Field of Classification Search
CPC ...... B32B 27/304; B32B 27/34; C09J 177/00; C09J 177/02; C09J 177/04; C09J 17/06; C09J 177/10; E04B 1/66; E04B 1/665; E04D 5/00; E04D 5/06; E04D 5/08; E04D 5/10
See application file for complete search history.

(56) References Cited

U.S. PATENT DOCUMENTS

| | | | |
|---|---|---|---|
| 4,442,148 A | 4/1984 | Stierli | ............................. 428/40 |
| 5,824,401 A | 10/1998 | Jenkins et al. | ................ 428/215 |

(Continued)

FOREIGN PATENT DOCUMENTS

| | | |
|---|---|---|
| CN | 103044829 A | 4/2013 |
| CN | 106715111 A | 5/2017 |

(Continued)

OTHER PUBLICATIONS

EP 1500493 Machine Translation (Year: 2005).*

(Continued)

*Primary Examiner* — Zachary M Davis
(74) *Attorney, Agent, or Firm* — Ostrolenk Faber LLP

(57) ABSTRACT

An edifice sealing web that includes a sealing web facing away from the edifice, an adjoining barrier layer which extends on the side facing the edifice and is based on mixtures of homopolyamides and/or copolyamides, and a self-adhesive layer.

30 Claims, 6 Drawing Sheets

(51) Int. Cl.
    *B32B 27/32*    (2006.01)
    *B32B 27/34*    (2006.01)
    *B32B 37/04*    (2006.01)
    *E04B 1/66*     (2006.01)
    *E04D 5/10*     (2006.01)

(52) U.S. Cl.
    CPC . *B32B 2307/538* (2013.01); *B32B 2307/7265* (2013.01); *B32B 2419/00* (2013.01)

(56) References Cited

U.S. PATENT DOCUMENTS

| | | | |
|---|---|---|---|
| 6,194,049 B1 | 2/2001 | Bindschedler-Galli et al. | ............ 428/76 |
| 10,919,283 B2 | 2/2021 | Keiser et al. | |
| 2005/0228165 A1* | 10/2005 | Nataniel | ................ C08G 69/02 528/310 |
| 2011/0177330 A1* | 7/2011 | Tanaka | ................... C08G 59/54 428/349 |
| 2013/0022825 A1 | 1/2013 | Meise et al. | ................... 428/441 |
| 2013/0157048 A1 | 6/2013 | Rudolf | ........................ 428/339 |
| 2014/0302281 A1* | 10/2014 | Yacovone | ......... B32B 17/10587 428/141 |

FOREIGN PATENT DOCUMENTS

| | | | |
|---|---|---|---|
| DE | 35 03 809 A1 | | 8/1986 |
| DE | 44 03 101 A1 | | 9/1994 |
| DE | 19653437 A1 | * | 6/1998 ............ E04G 21/28 |
| DE | 10212889 A1 | | 10/2003 |
| DE | 10212889 A1 | * | 10/2003 ............ C09J 177/02 |
| DE | 103 34 714 A1 | | 4/2004 |
| EP | 0 704 297 A1 | | 4/1996 |
| EP | 1 407 878 A1 | | 4/2004 |
| EP | 1 500 493 A1 | | 1/2005 |
| EP | 1 444 158 B1 | | 12/2005 |
| EP | 1 741 551 A1 | | 1/2007 |
| GB | 2 138 357 A | | 10/1984 |
| RU | 2013102119 A | | 10/2014 |
| WO | WO 2011/069680 A1 | | 6/2011 |

OTHER PUBLICATIONS

DE 10212889 Machine Translation (Year: 2003).*
DE 19653437 Machine Translation (Year: 1998).*
Search Report dated Aug. 21, 2020 in corresponding Russian Patent Application No. 2020116356/05(026726).
Decision to Grant dated Oct. 5, 2020 in corresponding Russian Patent Application No. 2020116356/05(026726).
International Search Report dated Dec. 17, 2018 in corresponding PCT International Application No. PCT/EP2018/078709.
Written Opinion dated Dec. 17, 2018 in corresponding PCT International Application No. PCT/EP2018/078709.
Softening Agent Loss, Structural Damage caused by Changing the Mechanical Properties of PVC Roof Membranes, Summary report of a research project, Jun. 1986, performed by Federal Institute for Materials Testing, Berlin, 3 pages (see spec. at p. 1 for relevance).
L. Glück, "Effect of Bitumen on Plastic—Roof Sheeting and Sealing Webs," Bauphysik, 2004, 10 pages (see spec, at p. 2 for relevance).
Search Report dated Sep. 3, 2021 in corresponding Chinese Application No. 201880068358.4.

* cited by examiner

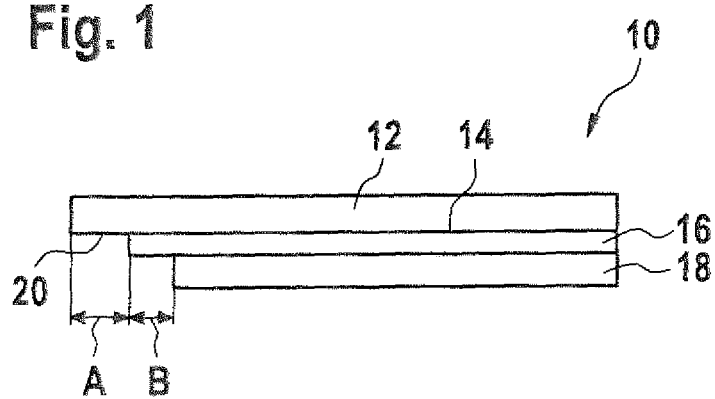
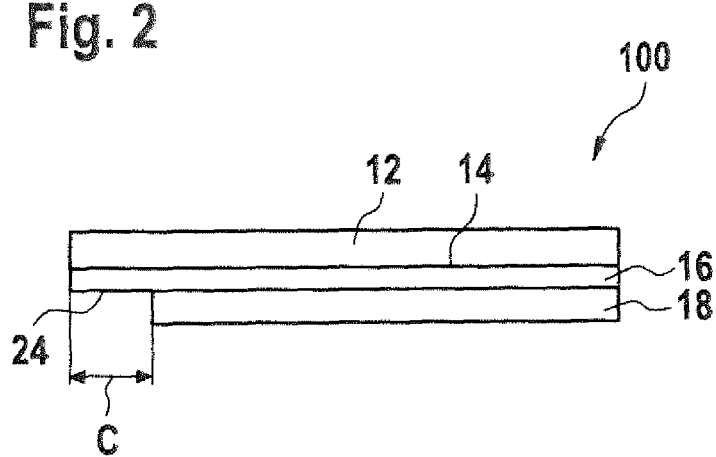

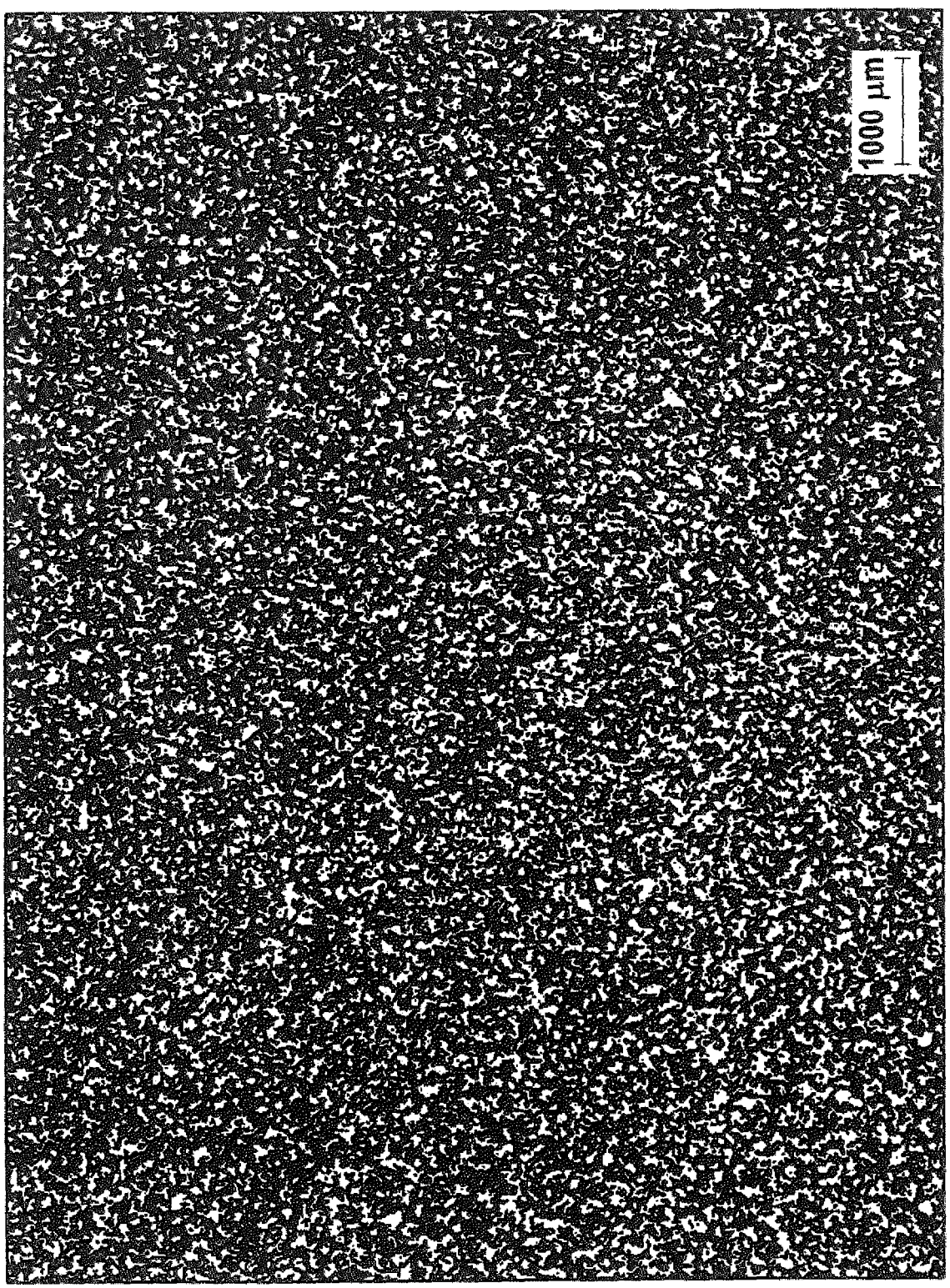

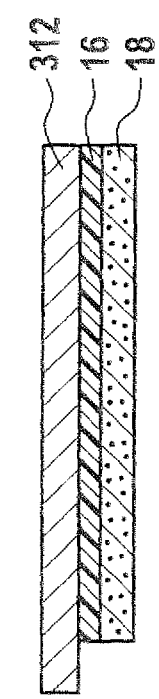
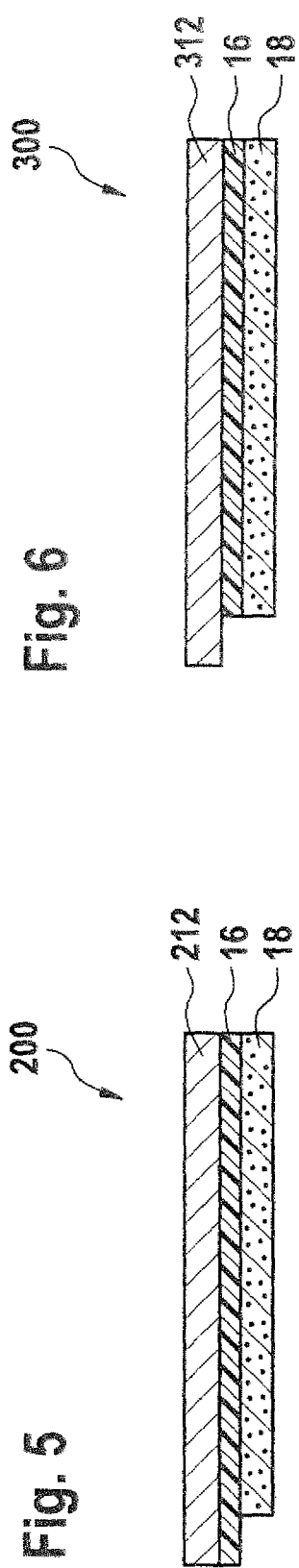
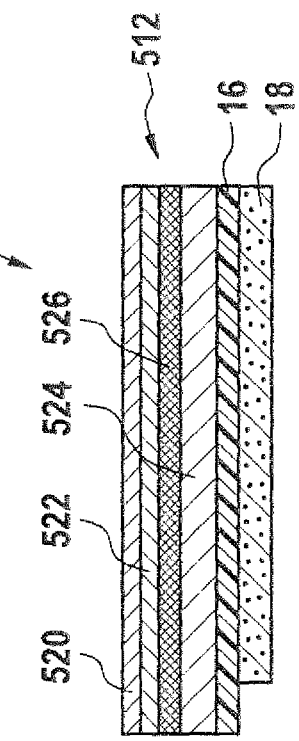
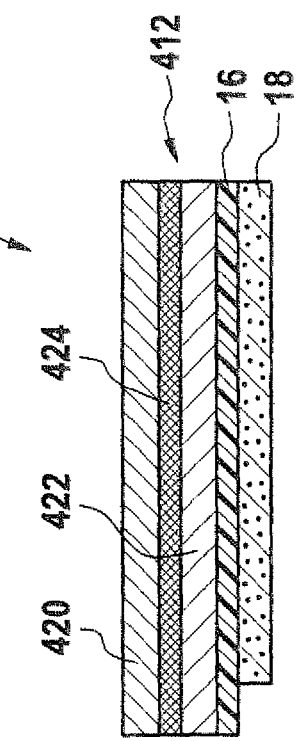

EDIFICE SEALING WEB, AND PROCESS FOR MANUFACTURING SAME

CROSS-REFERENCE TO RELATED APPLICATIONS

The present application is a 35 U.S.C. § § 371 national phase conversion of International Application No. PCT/EP2018/078709, filed Oct. 19, 2018, which claims priority to German Patent Application No. 10 2017 124 619.3, filed Oct. 20, 2017, the contents of both of which are incorporated herein by reference. The PCT International Application was published in the German language.

TECHNICAL FIELD

The invention relates to an edifice sealing web. The invention also makes reference to a process for manufacturing same.

BACKGROUND OF THE INVENTION

In order to protect in particular building surfaces from the effects of weather and from contact media, sealing webs made of bitumen, polymeric bitumen, plastic (predominantly thermoplastics) or elastomers are used.

When old surfaces (flat roofs, structural engineering) that were sealed with bituminous sheeting are being renovated, it is not possible to lay sheeting that is not compatible with bitumen directly on the old bitumen sealing membranes that are being renovated, because interactions occur between the plastic sheeting (often PVC-P-NB) and the bitumen in such a way that softening agents (monomeric softening agents such as e.g., DINP, DIDP or linear softening agents) or even other liquid components like ESBO or liquid thermal stabilizers migrate into the bitumen layer. In addition, direct installation on EPS (expanded polystyrene), which is used for insulation, is also not possible, because, in this case, interactions between the roof sheeting and the insulation are also possible in terms of excursions and the migration of volatile or liquid components (such as e.g., softening agents).

Because of the migration of the softening agent, the roof sheeting becomes brittle, it loses its flexibility, its dimensional stability, i.e., it shrinks a great deal due to the loss in mass and becomes very strongly sensitive to mechanicals stresses (literature reference: *Weichmacherverlust, Bauschäden in Folge Änderung mechanischer Eigenschaften von PVC-Dachbahnen* [Softening Agent Loss, Structural Damage caused by Changing the Mechanical Properties of PVC Roof Membranes] DDH 4/87, page 34 ff.: Summary report of a research project (June 1986), performed by the *Bundesanstalt für Materialprüfung* [Federal Institute for Materials Testing], Berlin).

For architectural reasons and to minimize the heating of the roof surface as much as possible, over the past few years light-colored sheeting has been used increasingly.

Even if these sheetings were classified as compatible with bitumen according to DIN EN 1548, discolorations of the surface occur when there is contact with bitumen.

These discolorations can be attributed to bitumen oils (flux oils) or other ingredients, which migrate through the plastic sheeting onto the surface and can impair in particular the joining behavior and the aging behavior.

A paper by L. Glück from 2003 *"Einwirkung von Bitumen auf Kunststoff—Dach- und Dichtungbahnen"* [Effect of Bitumen on Plastic—Roof Sheeting and Sealing Webs] showed that polymerically softened PVC-p sheetings are very resistant, but discoloration occurs in practice. Other sheetings based on EVA, CPE and FPO show evidence of a peculiarity in contact with bitumen and, in this case, in particular, the sheetings that are based on FPO. These sheetings absorb the bitumen oils very strongly, but do not release them again after reconditioning. The high absorption of the oils impacts the mechanical values. Swelling occurs. It must be assumed that the durability is affected by this.

Plastic roof sheeting and sealing webs with a self-adhesive layer (based on PVC-P) have been on the market since 1991. A bitumen rubber resin compound is still being used today by all means as a cold self-adhesive layer, but there are also self-adhesive layers that are based on other materials, e.g., based on acrylate, based on rubber or based on synthetic rubber such as SBR, or even styrene copolymers such as SBS, SIS, SEBS or SEPS or butyl rubber (also known as isobutene isoprene rubber or by the abbreviation IIR) are possible. Monomerically softened and thus non-migration-stable formulations based on PVC-p cannot come into direct contact with the cold self-adhesive layer, because the aforementioned interactions occur. Polymerically softened sheetings have a lower volatility because of longer-chained softening agents, but can break down the softening agents into short-chain elements due to aging, especially due to hydrolysis.

Light-colored sheetings that are compatible with bitumen also cannot be provided with such a mass to be cold self-adhering, because the aforementioned discoloration or other interactions occurs (in the case of FPO sheetings, a strong increase in mass due to the absorption of bitumen oils).

In order to avoid the dark or black color of bituminous sheetings as a visible surface, providing the corresponding sheetings with a cover layer, which is impermeable to light and UV radiation and designed to be colored is known (DE-A-44 03 101). However, it has been shown that the oils contained in bitumen migrate onto the surface of the cover layer so that spots form.

A multilayer sheeting is found in EP-A-1 500 493. To prevent the migration, it provides for the multilayer sheeting to have a non-metallic blocking layer, which runs between an outer polymer layer and a bitumen layer. In doing so, the non-metallic blocking layer that is based on polymers can be selected from the group of polyamide, ethylene vinyl alcohol, polyester and/or mixtures of same. In addition, reinforcing materials may be present in a layer. The reinforcing materials can be fleeces, a laminated fabric, fabric and/or combinations thereof.

DE-A-103 34 714 shows a roof sheeting, which has a fibrous layer on the building side, which is provided with a metallization in order to provide a shield against electromagnetic radiation.

DE-A-35 03 809 relates to a sealing web, which has an impregnated fibrous layer in order to be able to homogeneously weld corresponding sealing webs.

A film with an intermediate layer that is vapor-proof and impermeable to liquid is known from EP-A-0 704 297 in order to prevent oils from a bitumen sheet from penetrating onto the surface, by means of which an undesired discoloration would otherwise occur.

A multilayer roofing membrane is known from GB-A-2 138 357. One of these layers can be a fleece.

An intermediate layer that consists of VLDPE, which can contain polyvenyl fluoride, is found in a multilayer membrane according to U.S. Pat. No. 6,194,049. The corresponding intermediate layer is impermeable to vapor.

A multilayer sheet in accordance with U.S. Pat. No. 4,442,148 comprises a vapor-proof blocking layer, which does not necessarily have to be an intermediate layer.

Vapor-proof layers of a film bitumen composite are known from EP-A-1 407 878.

A roofing membrane according to EP-A-1 741 551 comprises a first layer for example of a polymer and a second layer, which inhibits the migration of bitumen and is an impregnated fluoroplastic layer, which is impregnated with a fleece synthetic as a means that inhibits migration.

EP 1 444 158 A1 shows a self-adhesive roof sealing web, which contains a monomeric softening agent.

A colored laminated bituminous membrane is known from EP 1 500 493 A, which has a color-resistant and weather-resistant bondable colored polymer layer, a non-metallic blocking layer consisting of polyamide for example, and a bitumen layer.

The subject matter of WO 2011/069680 A1 is a multilayer film, which can be used as a roof covering. One of the layers serves as the barrier layer.

SUMMARY OF THE INVENTION

The problem addressed by the present invention is making an edifice sealing web available, which stops an interaction between the adjoining surfaces, in particular between the materials of a surface to be covered, such as a roof, and a sealing web, such as a roofing membrane. What is supposed to be avoided in particular is that the softening agent migrates into the surface to be covered and/or that bitumen migrates out of the surface.

To solve the problem, an edifice sealing web is proposed comprising a sealing web facing away from the edifice, in particular containing a polymeric softening agent, an adjoining barrier layer which extends on the side facing the edifice and is based on mixtures of homopolyamides and/or copolyamides, and a self-adhesive layer.

The sealing web is preferably based on PVC-P (soft PVC).

It must be emphasized that the sealing web is based on PVC-P (soft PVC), containing a polymeric softening agent.

In particular, the barrier layer is based on aliphatic homopolyamides, copolymers thereof or mixtures thereof or contains same.

It must be emphasized in particular that the barrier layer consists of at least two layers, of which a first layer is a hot melt adhesive layer containing a copolyamide and a second layer is another layer containing a homopolyamide. In the process, in particular a film is an original constituent of the hot melt adhesive layer (also called melt adhesive layer).

In addition, it is possible for the second layer containing the homopolyamide to be designed to be multilayered and to have at least one layer based on polyolefins, such as polypropylene or polyethylene, or monomers thereof.

The hot melt adhesive layer containing copolyamide ensures that the polyamide-based second layer is able to bond without a problem with the sealing web.

Of course, the invention is not abandoned if the hot melt adhesive layer itself is structured to be multilayered, wherein one layer is structured based on polyolefins, and contains in particular polyethylene or polypropylene.

In this respect, layer systems can be employed such as those that are known from the prior art. Layer systems in this regard are normally indicated such as PP (polypropylene)/PA (polyamide)/PP (polyethylene), PE/PA/PE, PA/EVOH (ethylene vinyl alcohol polymer), PA/EVOH/PE or PA/EVOH/PP.

The advantage of the multilayer structure is that the thickness of the layer containing polyamide can be very low, so that the processability required for manufacturing the edifice sealing web is present based on the at least one other layer based on a polyolefin in particular.

It must also be noted that the edifice sealing web according to the invention is characterized in particular in that, apart from the sealing web, a reinforcing material such as fleece, laminated fabric, fabric and/or combination[s] thereof are not present. A reinforcing material in this respect could be present exclusively in the sealing web itself.

The invention provides among other things that the edifice sealing web consists of a direct layer sequence of sealing web facing away from the edifice, a directly adjoining barrier layer which extends on the side facing the edifice and which is based on polyamide or copolyamide, and a directly adjoining self-adhesive layer.

For its part, the sealing web itself can be designed to be multilayered and also have a reinforcement such as laminated fabric, fleece or the like, such as is known from the prior art. Then, according to the teaching of the invention, the barrier layer, which is based on homopolyamide or copolyamide, especially on homocopolyamide and copolyamide, is applied to a corresponding sealing web, and the self-adhesive layer to said barrier layer adjoining it.

In general, the copolyamides, also called TPA, are based on thermoplastic copolyamides, one or more of the following raw materials: lactams (e.g., caprolactam, laurinlactam), amino carboxylic acids (e.g., aminoundecanoic acid), diamines (e.g., hexamethylene diamine), dicarboxylic acids (e.g., adipic acid, azelaic acid, dodecandioic acid) and polyethylene glycols (e.g., PEG 600). The copolyamides develop from the polycondensation of the individual monomers cited above. A copolyamide polymer chain develops, which has a statistical distribution of the monomers.

The melting temperatures of the individual copolyamides are adjusted by controlling the individual monomers.

Surprisingly, it has been shown that when the barrier layer that is based on polyamide consists in particular of one or more homopolyamides and one or more copolyamides, or contains the same, the undesired migration is reduced or suppressed. In particular, the migration of bitumen into the sealing web and the migration of the softening agents from the sealing web into the self-adhesive layer is diminished or reduced. Barrier layers based on homo- or copolyamides show substantial advantages over those that are based on polyester or thermoplastic polyurethane. Comparative tests have shown this. Thus, the following samples were compared:

A first group (group A) consisted of sections of an edifice sealing web corresponding to the teaching according to the invention. One based on a soft PVC was used as a sealing web. Then, a blocking layer based on copolyamide was applied to the corresponding sealing web. This was then covered by a bitumen-based adhesive as a self-adhesive layer.

A second group (samples B) of sections of a sealing web had a blocking layer based on polyester instead of the blocking layer based on copolyamide. The sealing web and self-adhesive layer were not altered in terms of their compositions.

The third samples (samples C) of a sealing web contained thermoplastic polyurethane as a blocking layer, wherein, corresponding to samples A and B, the sealing web and the self-adhesive layer remained unchanged.

Samples A, B and C were then tested for four weeks in a heating furnace at 90° C. As a result, it could be established that samples B and C, i.e., those that used polyester or thermoplastic polyurethane for the barrier layers, showed evidence of a liquification of the adhesive layer. This indicates that there was an interaction between the softening agents of the sealing web and the self-adhesive layer. As a result, a barrier function did not exist in a strict sense. In contrast, samples A, which had a blocking layer based on polyamides, did not show any evidence of a corresponding liquification of the self-adhesive layer.

In particular, the barrier layer can contain or consist of
a) 10-95% by weight of a copolyamide that is based on a combination of equimolar quantities of piperazine and a $C_6$-$C_{20}$, as the case may be, amino substituted dicarboxylic acid
b) 5-90% by weight of a copolyamide, which contains polyether sequences,
c) as the case may be, 5-50% by weight of other copolyamides and, as the case may be, 0.5-15% by weight of additives.

It is also possible for the barrier layer to contain or consist of
a thermoplastic compound containing copolyamide of 70-99%, preferably 90-99%
a lubricating agent or antiblocking agent of 0 to 30%, preferably of 2 to 5%
a propellant of 0.2 to 30%, preferably of 0.2 to 1.0%.

It is furthermore possible for the barrier layer to contain or consist of
a polyamide of 20-95%, preferably of 65-95%
a supramolecular polymer of 5 to 80%, preferably of 5 to 35%

The percent by weight adds up to 100%.

Designated as supramolecular polymers are polymers whose components are not composed of covalent bonds but of weaker intramolecular bonds—this includes hydrogen bridge bonds, ionic bonds, Van der Waals forces or even hydrophobic interactions. In contrast to covalent bonds, intramolecular bonds are able to be broken down more easily, above all with use at a high temperature, and are also able to reform rapidly, however, during cooling. In many a case, said polymers are also designated as "self-healing." A side effect of the weak bonds is a low viscosity of melting supramolecular polymers, which makes a processing easier.

The supramolecular polymers are preferably obtained by a reaction of 1-(2-aminoethyl)-2-imidazolidone (UDETA) in a mixture consisting of:
51 to 100% of one or more identical or different fatty acid dimers and/or one or more identical or different fatty acid trimers
and 0 to 49% of one or more identical or different fatty acid monomers.

In particular, the invention is characterized in that the polyamide is a mixture of different polyamides, in order to be able to adjust desired properties. A mixture can consist e.g., of the homopolyamides PA6, PA6.6 and/or PA12.

In order to obtain a good adhesion to the adjoining sealing web, a corresponding layer consisting of a homopolyamide basis should be covered on the side facing the sealing web with the hot melt adhesive layer, which can also be called the hot melt layer. The corresponding layer should be structured based on one or more copolyamides.

It is preferably provided that the barrier layer is a fused film, which, for its part, can consist of a plurality of layers or films.

The barrier layer can have a thickness $D_B$ of 5 $\mu m \leq D_B \leq 300$ $\mu m$, in particular of 25 $\mu m \leq D_B \leq 60$ $\mu m$.

Edifice sealing webs are usually delivered in rolls. So that it is possible to separate the sides that are lying on top of each other during the unrolling process, the outer side of the edifice sealing webs, i.e., the free outer surface of the sealing web, is embossed. Without an embossing, so-called blocking would occur, whereby the adhesive forces hold the individual layers of the rolled goods that are lying on top of each other together and unrolling is in turn hampered. The surface hereby experiences punctiform indentations in a substantially regular progression, as can be seen in the illustration in FIG. 3. With corresponding embossing, it has been found, in the case of an edifice sealing web according to the invention, that lasting air bubbles form between the barrier layer and the sealing web, whereby a detachment of the barrier layer can occur.

It is provided according to the invention that the surface of the sealing web be embossed in such a way that a flatter structure is produced from the roughness such as can be seen in the illustration according to FIG. 4.

An embossing roll with the following roughness values was used for embossing: Lc=2.5 μm, Ra=2.5-10 μm, Rz=20-50 μm, R max=25-65 μm, wherein R max=the maximum roughness depth, Ra=the arithmetic mean roughness value, Rz=the averaged roughness depth and Lc=the wavelength of the profile filter.

As FIG. 4 shows, the sealing web is embossed such that a random distribution of the indentations is yielded, because a microstructured embossing roll was used.

Comparative tests have shown that, due to the respective roughness in the case of the sealing web according to the invention, a formation of bubbles is ultimately prevented.

Thus, sealing webs according to the invention with embossing according to the prior art (group A) and samples with an embossing according to the invention (group B) were stored in water vapor at 70° C. over a period of four weeks. In the case of samples A, a strong formation of bubbles could be established, which disappeared only slightly after 24 hours. Regions between the barrier layer and sealing web were separated.

Even though it was possible to identify a formation of bubbles, which was very limited, however, in the case of samples B, they disappeared completely after 24 hours.

To ensure that the formation of air bubbles between the barrier layer and the sealing web, which can lead to a destruction of the barrier layer, is ruled out it is therefore proposed that the surface of the sealing web that is connected to the barrier layer which extends on the side facing the edifice has a maximum roughness depth R max of between 10 μm and 80 μm, an averaged roughness depth of between 10 μm and 60 μm and an arithmetic mean roughness value of between 1.5 μm and 12 μm.

The embossing can be designated as grained embossing or imitation leather embossing or artificial leather embossing.

The self-adhesive layer should have a thickness $D_S$ of 0.5 mm$\leq D_S \leq$1.1 mm, in particular of 0.7 mm$\leq D_S \leq$0.9 mm.

A further development of the invention provides that the sealing web consists of at least one material from the group of PVC (polyvinyl chloride), TPE (thermoplastic elastomer), TPO (thermoplastic elastomer based on olefin), TPV (thermoplastic vulcanizate), EPDM (ethylene propylene diene rubber), EVA (ethylene vinyl acetate), PP (polypropylene), PE (polyethylene), PA (polyamide) or contains at least one of these materials.

In particular, the sealing web can have the following structure:
a) a homogeneous sealing web—i.e., one layer, without a liner/reinforcement or b) a two-layer sealing web—upper layer, liner/reinforcement, lower layer or
c) a multilayer sealing web—upper/lower layers are separated again into two layers for example.

The following can be considered with respect to the liner/reinforcement:
d) Polyester-based or glass-based fabric, laminated fabric, fleeces, Raschel fabric or any combinations of same,
e) Gram weights preferably of 30 to 130 g/m².

Lacquers on the upper side are also possible with e.g., a thickness of 4 µm to 30 µm based on acrylate, polyamide or fluorine.

In particular, the sealing web includes a base polymer, a polymeric softening agent based on an adipic acid polyester or sebacic acid polyester with an average molecular weight of 3,000 to 12,000 and/or a monomeric softening agent e.g., based on phthalic acid esters, and/or a polyacrylate and/or a rubber-like polymer, which is composed preferably of (a) 40 to 80, preferably of 50 to 80 and in particular of 55 to 75% by weight of butyl acrylate or, as the case maybe, of a mixture of butyl acrylate and 2-ethylhexyl acrylate containing up to 40% by weight of 2-ethylhexyl acrylate, (b) of 5 to 35, preferably 5 to 20% by weight at least of a substance selected from the group consisting of methyl methacrylate, ethyl methacrylate, methyl acrylate or ethyl acrylate (c) of 4 to 30, preferably 6 to 30, in particular 10 to 25% by weight of acrylonitrile, (d) of 3 to 25, preferably 5 to 18, in particular 8 to 14% by weight styrene, (e) of 0.5 to 8, preferably 1 to 5, in particular 2 to 4% by weight of a maleate semi-ester soap and of 0.25 to 8, preferably 0.5 to 4, in particular 1 to 3% by weight of a crosslinking agent.

Base polymers are understood as polymers that are normally used to manufacture sealing webs. In particular, polyvinyl chloride (PVC) or even polyvinyl chloride copolymers are used as base polymers. Mixtures thereof can likewise be used. The base polymer is used for example in proportions of 20 to 60% by weight, preferably of 35 to 55% by weight. All indications in percent by weight relate hereby to the entire composition.

The adipic acid polyester or sebacic acid polyester is used for example in proportions of 20 to 45% by weight, preferably of 25-35% by weight.

Furthermore, the composition for manufacturing the sealing web can contain a polyacrylate. Possible as polyacrylates that can be used are for example ethyl butyl acrylate, butyl acrylate, copolymers of acrylic acid and vinyl chloride, MMA or PMMA. The polyacrylate component makes a substantial contribution to improving the aging and weather resistance of the sealing webs and is used primarily with two-layer or multilayer systems in the upper layers.

From the aforementioned polyacrylates, the use of butyl acrylate is especially preferred.

In terms of the composition, the polyacrylate can be used in the form of butyl acrylate particles coated with PMMA or MMA. These butyl acrylate particles preferably have an average particle size of 100 µm or less, very especially preferably the average particle size is between 5 and 40 µm.

Another polyacrylate is a copolymer of acrylic acid with vinyl chloride, in particular a graft copolymer of these compounds. These types of graft polymers are used in a preferable manner as a granulate with a particle size of between 0.25 and 5 mm, especially preferably between 1 and 2 mm.

The polyacrylates used have an average molecular weight of 5,000 to 120,000, preferably of 10,000 to 100,000.

The polyacrylates used are used in the case of the compositions for example in proportions of 3 to 30% by weight, preferably of 8 to 25% by weight, in particular 10 to 20% by weight. Sealing webs of compositions with such proportions of polyacrylates have an especially high aging resistance and can also be processed very well at lower temperatures.

Especially preferred is the use of the rubber-like polymer marketed by Omnova Solutions under the trade name of Sunigum®. In the roofing membranes according to the invention, the polymer can be used in quantities of 1 to 30, preferably of 5 to 20 and in particular of 8 to 15% by weight.

The adipic acid polyester is structured in particular of adipic acid and 1,4-butanediol.

The compositions of the sealing webs can also contain additional additives such as fillers, pigments, dyes, UV stabilizers, thermal stabilizers, fungicides, biocides, processing aids and additional softening agents. These additional softening agents are preferably low-molecular weight, monomeric softening agents such as e.g., phthalic acid ester (phthalates). In addition, conventional softening agents known from prior art that are compatible with PVC can be used as softening agents. Typical softening agents are for example derivatives of abietinic acid or acetic acid derivatives such as for example cumylphenyl acetate, derivatives of adipic acid such as benzyl octyl adipate, dibutyl adipate, di-isobutyl adipate, di-(2-ethylhexyl) adipate, diisononyl adipate, derivatives of azelaic acid, benzoic acid derivatives, polyphenyl derivatives, citric acid derivatives, epoxidized fat derivatives as well as glycol derivatives. In addition, bio-based softening agents can also be used, i.e., softening agents that contain (at least in part) renewable raw materials.

The composition preferably contains less than 30% by weight of additional softening agents, especially preferably less than 15% by weight.

To increase the thermal stability of the sealing webs, heat stabilizers known from the prior art can also be included such as e.g., Ba/Zn stabilizers, preferably Ca/Zn stabilizers. Furthermore, UV stabilizers can also still be included such as, for example, oxalanilides, amides, titanium dioxide, carbon black, in particular Tinuvin® and/or Chimasorb® and/or in particular NOR-HALS stabilizers. The stabilizers are normally contained in quantities of 0.01 to 10, preferably 0.1 to 5% by weight. The total quantity of stabilizers does not normally exceed 20% by weight of the mixture.

As fillers the sealing web can contain conventional fillers known from the prior art, such as chalk, talcum, silicic acids or kaolin as a filler. The quantity of fillers is 0 to 15, preferably 1 to 10% by weight.

In addition, still other conventional ingredients can be included such as, e.g., lubricating agents, processing aids, gelling aids, UV converters, UV stabilizers or biocides such as for example thiazoline derivatives, tributyl tin, chloroisothiazolin, with isothiazolin derivatives being especially preferred.

The sealing web can also have a fiber reinforcement. This fiber reinforcement can consist of a fleece, laminated fabric and/or a fabric. In doing so, the fiber reinforcement can consist of fibers that are selected from glass fibers, mineral fibers, polyester fibers, polyamide fibers, polyethylene fibers, polypropylene fibers or of mixtures thereof.

In particular, the sealing web comprises an interior liner or reinforcement.

The self-adhesive layer should consist of at least one material from the group of bitumen, synthetic rubbers such as butyl, styrene copolymers such as SBS, SBR (styrene butadiene rubber), acrylate compounds, silane terminated polymers or polyolefins or other suitable adhesives having good adhesive properties or contain at least one of these materials.

The edifice sealing web according to the invention leads to a significant improvement in the aging behavior of the sealing web, because there is no direct contact between said sealing web and the material of the surface, to which the edifice sealing web is applied. An interaction is ruled out. A migration of the softening agent from the sealing web, such as the roofing membrane, to the surface to be covered, is prevented.

The invention also relates to a process for manufacturing an edifice sealing web, comprising the processing steps
  Manufacturing a sealing web, such as a roofing membrane,
  Affixing a barrier layer based on a polyamide on one side of the sealing web,
  Applying a molten self-adhesive layer to the barrier layer while simultaneously melting or fusing the barrier layer due to the heat input of the self-adhesive layer.

The barrier layer thereby is a film in particular and can preferably be designed to be multilayered, wherein one layer is structured based on homopolyamide and another layer is structured based on copolyamide. The layer that is based on copolyamide is facing the sealing web in the process.

In accordance with the teaching according to the invention, the concept "based on polyamide" should be understood as based on homopolyamide and/or based on copolyamide, wherein in particular mixtures of homopolyamide and/or copolyamides are used.

With respect to the homopolyamides, it must also be noted that said homopolyamides are in particular aliphatic homopolyamides.

According to the invention, a two-stage process so to speak is carried out in order to manufacture the sealing web. Thus, in a first step, the sealing membrane itself is manufactured, in particular in a calandering process. Then, the barrier layer that is based on polyamide is applied in the form of a film, a so-called hot melt film, wherein a fusing does not take place, rather merely a heating is undertaken to the extent that a shifting of the barrier film with respect to the sealing web cannot occur.

Various measures can be used to heat the barrier layer or the barrier film. Thus, e.g., the heat can be applied via the sealing web, on which the barrier layer or barrier film is applied during the manufacturing of the edifice sealing web, which gives off the required heat. This can take place from the substrate on which the sealing web is located. Thus, e.g., the sealing web can be conveyed by means of a transport belt when applying the barrier layers or barrier film, wherein the transport belt is warmed or heated to the extent necessary.

Because, in order to affix the barrier layer or barrier film, said barrier layer or barrier film is pressed on the sealing web, preferably using a pressure roller, it can be heated to the desired temperature. This can take place e.g., by means of water, water vapor or oil.

Of course, it is also possible to heat the barrier layer or barrier film and the sealing web with hot air or with infrared radiators so that the barrier layer or barrier film is affixed to the sealing web.

Then, the self-adhesive layer is applied and fused, wherein a heating should take place to temperatures of between 120° C. and 180° C. Because of the heat input in this respect, the barrier film is melted or fused so that the required connection to the sealing web is ensured, on the one hand, and to the self-adhesive layer, on the other.

Due to the process measures in this regard, there is both a conservation of energy and savings of time over the prior art.

In order affix the hot melt film, i.e., the barrier film, a heating to a temperature that is preferably between 60° C. and 80° C. takes place.

Further details, advantages and features of the invention are yielded not only from the claims, from which these features can be taken, by themselves and/or in combination, but also from the following description of preferred exemplary embodiments.

BRIEF DESCRIPTION OF THE DRAWINGS

The drawings show:
FIG. 1 A first embodiment of an edifice sealing web according to the invention,
FIG. 2 A second embodiment of such an embodiment,
FIG. 3 An illustration of an embossed sealing web according to the prior art,
FIG. 4 An illustration of an embossed sealing web according to the invention,
FIG. 5 An embodiment of a sealing web with a single layer sealing web,
FIG. 6 A further embodiment of a sealing web with a single layer sealing web,
FIG. 7 A sealing web with a two-layer sealing web with a liner,
FIG. 8 A sealing web with a three-layer sealing web with a liner,
FIGS. 9 and 10 Schematic diagrams of the manufacturing process of sealing webs according to the invention, and
FIG. 11 A further embodiment of a sealing web.

DESCRIPTION OF PREFERRED EMBODIMENTS

FIGS. 1 and 2 each depict purely in principle and in section an edifice sealing web 10, 100, wherein the same reference symbols are used for the same elements.

The main application of the edifice sealing web is the covering of roofs, even though this should not constitute a restriction of the invention thereto. Even the sealing of for example swimming pools, terraces or parking surfaces are cited as application cases.

The edifice sealing web according to the invention is supposed to prevent or inhibit the migration of bitumen, flux oils and/or softening agents or their volatile components and/or expanded polystyrene. There should be the possibility of the diffusion of water vapor or oxygen on the other hand.

The embodiment of the edifice sealing web 10 shown in FIG. 1 consists of a sealing web 12 facing away from the edifice, which can be a roofing membrane, which consists in particular of at least one material from the group of PVC (polyvinyl chloride), TPE (thermoplastic elastomer), TPO (thermoplastic elastomer based on olefin), TPV (thermoplastic vulcanizate), EPDM (ethylene propylene diene rubber), EVA (ethylene vinyl acetate), PP (polypropylene), PE (polyethylene), PA (polyamide) or contains at least one of these materials.

The sealing web 12 can consist of a plurality of layers, of which at least one can also be a reinforcing layer e.g., of fleece, glass fabric, etc. In this respect, reference is made to the prior art.

A barrier layer 16 is applied to the underside, i.e., the surface 14 of the sealing web 12 facing the edifice. In particular a fusible film, a so-called hot melt film, is used for this purpose. Independent of this, the barrier layer 16 consists of a polyamide, in particular a homo- and/or copolyamide or a mixture thereof or contains same.

Figure 11:
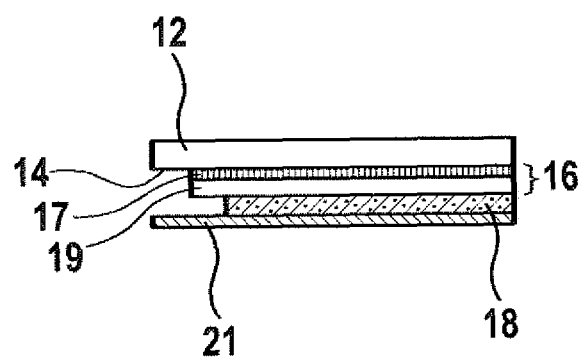

It is provided in particular that the barrier layer 16, 17, 19 is designed to be multilayered, as FIG. 11 shows. In doing so, the layer 17 adjoining the sealing web 12 contains copolyamide, in particular a mixture of copolyamides. The adjoining layer 19 is based preferably on homopolyamide and can contain mixtures thereof. PA6, PA6.6 and/or PA12 in particular can be considered as homopolyamides.

Generally speaking, the layer 19 should contain one or more aliphatic homopolyamides in order to obtain the desired barrier effect.

Independent hereof, the barrier layer 16 to be applied to the surface 14 of the sealing web 12 which extends on the side facing the edifice, whether this is designed to be single layered or multilayered, is not fused to begin with. Rather the barrier layer 16 to be applied in the form of a film is heated to such an extent that an affixing on the surface 14 takes place, in other words, merely a shifting during the subsequent application of a self-adhesive layer 18 is prevented.

In particular, it is provided that the self-adhesive layer 18 consists of or contains at least one material from the group of bitumen, butyl, SBS, SBR (styrene butadiene rubber), acrylate compounds, silane terminated polymers or polyolefins or other suitable adhesives having good adhesive properties.

If the single layer or multilayer film that achieves the barrier effect, i.e., the barrier layer 16, is heated preferably at a temperature of between 60° C. and 80° C. in order to make possible the desired affixing on the underside 14 of the sealing web 12, the self-adhesive layer 18 that is applied in a molten state has a temperature in particular of 120° C. to 180° C. The heat input of the self-adhesive layer 18 suffices in order to simultaneously melt or fuse the barrier layer 16 to such an extent that the required connection to the sealing web 12 is ensured, on the one hand, and to the self-adhesive layer 18, on the other.

In other words, the temperature required to affix the barrier layer 16 is not sufficient to prevent a detachment of the sealing web 12. Only through the heat input via the self-adhesive layer 18 applied to the barrier layer 16 does a connection take place between, firstly, the barrier layer 16 and the sealing web 12 and, secondly, to the self-adhesive layer 18 to such an extent that detachment is prevented. This was confirmed by climate change tests.

Thus, samples A were manufactured that consisted of a section of a sealing web that was based on soft PVC. A barrier layer according to the invention was applied to this. In the process, a temperature of 70° C. acted on the hot melt barrier layer, whereby an affixing on the barrier layer took place.

Furthermore, samples B were manufactured, whereby, corresponding to samples A, to begin with the barrier layer was applied to a sealing web of the same composition and was affixed at a temperature of 70° C. in order to subsequently apply a self-adhesive layer to the hot melt barrier layer with or at a temperature of 140° C.

Then, climate change tests were carried out with samples A and B, and, specifically 100 cycles in accordance with ASTM E 1171. The samples were exposed to a temperature of 85° C. and an atmospheric humidity of 85% over a period of 20 hours. Then, a cooling to −40° C. took place in order to subsequently heat the samples to 85° C. again. During cooling, the samples were exposed to normal air. The cooling from a temperature of 85° C. to −40° C. and heating to 85° C. took approx. four hours, wherein the samples were kept at the temperature of −40° C. for over half an hour.

Then, the self-adhesive layer was removed in the case of samples B. Subsequently an attempt was made to detach the barrier layer from the sealing web. This was not possible. On the other hand, the barrier layer could be detached in the case of samples A or it was already detached on the surface of the sealing web, because the temperature applied to affix the barrier layer on the sealing web was obviously not adequate to bring about the required connection between the barrier layer and the sealing web.

Moreover, the self-adhesive layer 18 can also be designed as a welding mass that is based on bitumen. In other words, the welding mass is activated by the heat effect of a burner and can thusly be applied to the substrate.

As the graphic representation shows, the barrier layer 16 runs at a distance from the left edge of the sealing web 12. A distance A of between 5 cm and 6 cm can be maintained.

The self-adhesive layer 18 in turn runs at a distance from the left edge of the barrier layer 16, wherein the distance B can be 1 cm to 2 cm.

Regardless of the distance of the barrier layer 16 from the left edge of the sealing web 12, it is ensured that a migration is prevented because the uncovered edge region 20, which forms a weld edge, is placed on an adjacent sealing web in order to be welded therewith. Because, in the exemplary embodiment, the sealing web 12, the barrier layer 16 and the self-adhesive layer 18 run flush with each other on the right edge side, consequently the edifice is shielded completely via the barrier layer 16 with respect to the sealing web 12.

The distance B constitutes virtually a safety distance so that the self-adhesive layer 18 is not able to make direct contact with the sealing web 12.

In the case of the exemplary embodiment in FIG. 2, the barrier layer 16 extends full-surface over the entire underside, i.e., surface 14, of the sealing web 12. The self-adhesive layer 18 on the other hand runs at a distance from the left edge of the sealing web 12 and thus of the barrier layer 16. This region of the edifice sealing web that is not covered by the self-adhesive layer 18 is the weld edge 20, which is welded with an adjacent sealing web.

Due to the welding, it is simultaneously ensured that the edge strip of the barrier layer 16 that is not covered by the self-adhesive layer 18 melts to the required extent in order to connect to the underside, i.e., the surface 14, of the sealing web 12. The distance C between the left edge of the sealing web 12 and the left edge of the self-adhesive layer 18 can be 5 cm to 6 cm.

Because of the measures according to the invention, a full-surface protection takes place over the complete edifice that is supposed to be sealed.

As illustrated purely in principle in FIG. 11, the self-adhesive layer 18 can be covered on the outer side by a removable protective film 21 or a protective liner.

FIGS. 5 to 8 show schematic diagrams of edifice sealing webs 200, 300, 400, 500, all of which are characterized in that, a barrier layer 16, which consists of polyamide, copolyamide or mixtures thereof, runs along the undersides of the sealing webs 212, 312, 412, 512, i.e., the sides facing an edifice to be sealed.

The sealing webs 200, 300 in FIGS. 5 and 6 comprise single layer sealing webs 212, 312. The barrier layer 16 extends completely along the underside of the sealing web 212. The self-adhesive layer 18 is at a distance from the left edge and emanates therefrom running along the outer side of the barrier layer 16 in order to make a weld edge available. Said weld edge is also found in the sealing web 300, wherein the barrier layer 16 runs in accordance with the extension of the self-adhesive layer 18. The sealing web 312 is likewise a single layer.

In the case of FIG. 7, the sealing web 412 has a two-layer structure (layers 420, 422), between which a reinforcement or liner 424 runs, which can be designed e.g., as glass fleece, fabric or the like. Running along the underside of the layer 422 is the barrier layer 16, which when a weld edge is formed is covered by the self-adhesive layer 18.

According to the embodiment in FIG. 8, the sealing web 512 consists of three layers 520, 522, 524, wherein a reinforcement 526 runs between the layers 522, 524. The extension of the barrier layer 16 and the self-adhesive layer 18 corresponds to that of FIG. 7.

Figure 3:
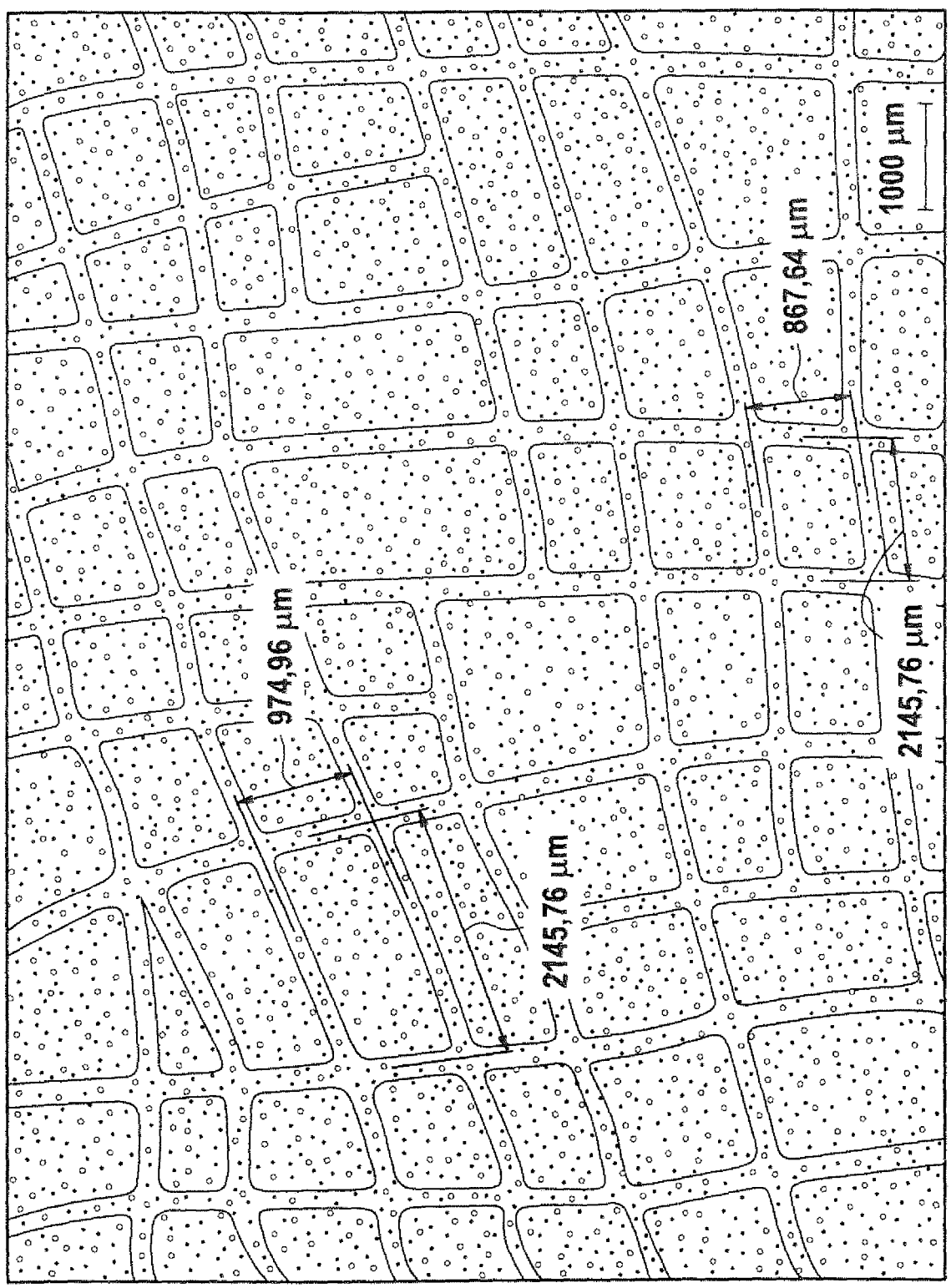
Figure 9:
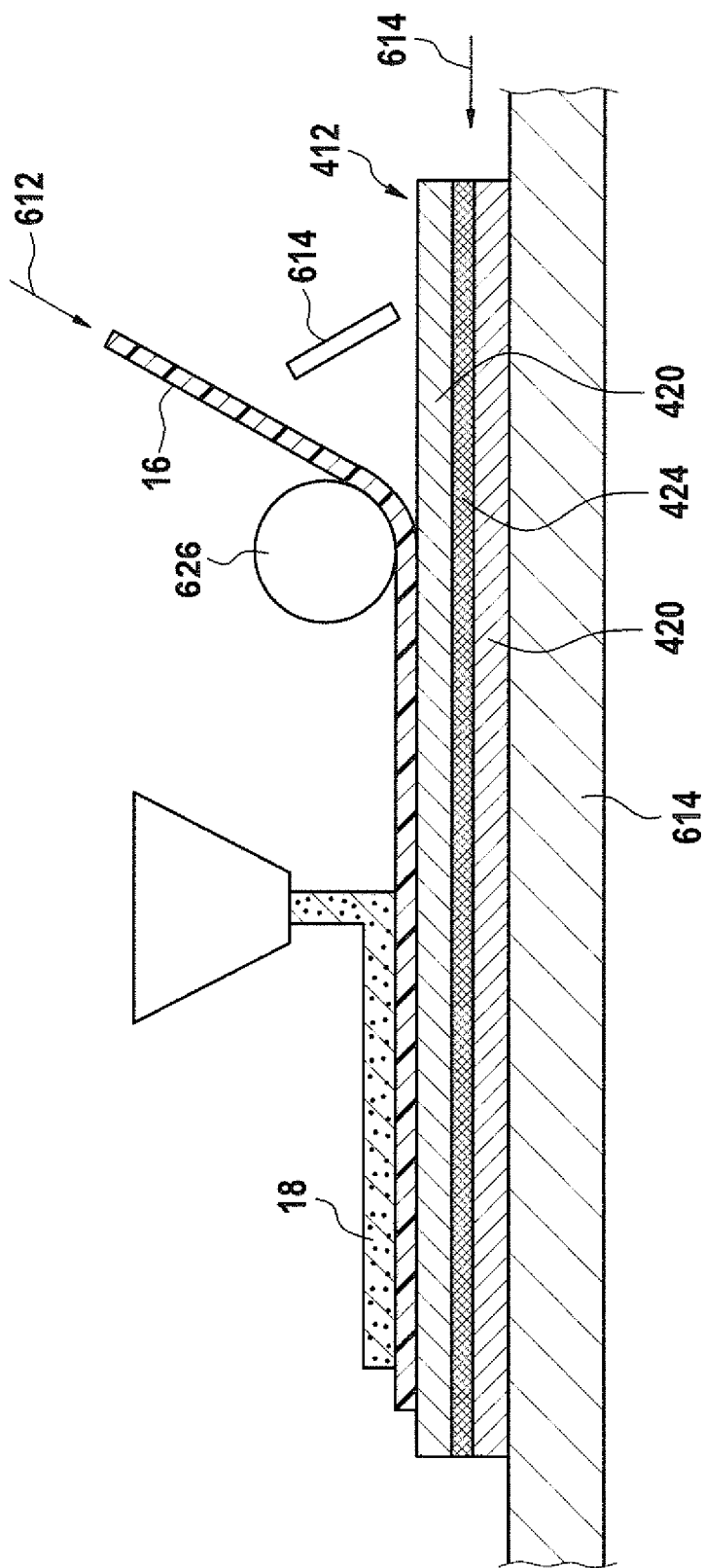

FIG. 9 depicts a schematic procedure for manufacturing an edifice sealing web according to the invention. In the process, arrows 612 or 614 indicate the conveyance or transport direction.

A two-layer sealing web 412, such as the one in FIG. 7, is arranged on a transport belt 616. The sealing web 412 consists thus of a layer 420, which is positioned directly on the transport belt 616, the adjoining liner 424, e.g., in the form of a fabric, and the layer 422, which, in the finished sealing web 400, faces the edifice to be sealed. Thus, in the finished sealing web, the layer 420 is the outer layer, which can be lacquered as the case may be.

A hot melt film, which forms the barrier layer 16, is removed from a roll (not shown) and applied to the outer side of the layer 422. In the process, an affixing takes place at a temperature of approx. 70° C. This temperature is generated by means of e.g., an infrared radiator 615 prior to the application of the hot melt film to the surface of the layer 422 so that the applied hot melt film is affixed. For this purpose, the hot melt film can also be pressed on the layer 422 by means of a revolving roller 626.

It is also possible as an alternative or a supplement that the transport belt is heated to the required extent so that there is a heat input in the barrier film 16, which ensures an affixing on the surface of the sealing web. The pressure roller 626 can also be heated e.g., by means of water, water vapor or oil, to a desired temperature, so that the barrier layer 16 can be affixed on the sealing web 412.

At a distance from the roller 626, an adhesive is applied in layer form and is distributed in a constant layer thickness by means of a scraper so as to form the self-adhesive layer 18. In the process, the adhesive can already have the required temperature in a range of between 120° C. and 180° C., thereby ensuring that the required connection is achieved both between the hot melt film and the layer 422 as well as between the adhesive forming the self-adhesive layer 18 and the hot melt film.

The transport belt 616 can be cooled after the adhesive is applied in order to then roll up the cooled edifice sealing web e.g., onto a roll or to cut it to size to the desired extent.

The outer side of the layer 420 of the sealing web 412, which extends on the side of the transport belt, comprises the required graining or embossing, such as is shown in FIG. 4 for example, in order to facilitate an unrolling without a problem when the edifice sealing web is rolled up.

A corresponding embossing is also located on the side of the sealing web 412 facing the barrier layer 16 in order to prevent a formation of bubbles between the sealing web 412 and the barrier layer 16 to such an extent that a detachment does not occur.

Figure 10:
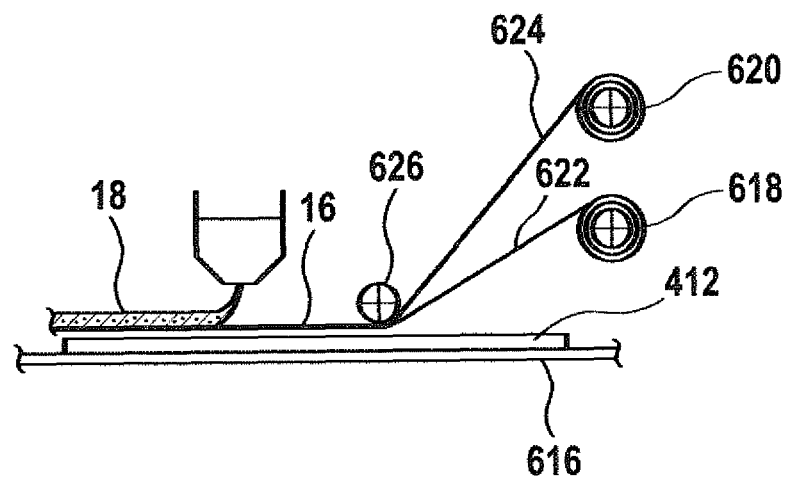

FIG. 10 is also supposed to show a schematic diagram of the manufacturing process of the edifice sealing web in accordance with FIG. 11, wherein reference symbols are used which can be taken from FIG. 9.

Thus, first of all, the sealing web 412, which is designed in particular to be multilayered and can have a reinforcing liner, is arranged on the transport belt 616.

Films 622, 624 are unwound from reels 618, 620, and said films are pressed on the sealing web 412 by means of a pressure roller 626 in order to then be affixed on the surface of the sealing web 412 by means of a heat source (not shown).

The films 622, 624 form the barrier layer 16. In the process, the film 622 lying directly on the sealing web 412 is based on copolyamide, in particular on mixtures of copolyamides, in order to ensure the required adhesion. The film 622 is in particular a heat-seal adhesive film or a hot melt film. The film 622 itself can also be structured to be multilayered and can comprise one or more layers, of which one or a plurality thereof are based on polyolefin.

The film 624 is based on homopolyamide and comprises in particular mixtures of homopolyamides, in particular aliphatic homopolyamides. PA6, PA6.6 and/or PA12 in particular can be considered as homopolyamides.

In accordance with the explanations of FIG. 9, the self-adhesive layer 18 is then applied to the free surface of the blocking layer 16, i.e., the film 624, which self-adhesive layer 18 is heated to such an extent that the films 622, 624 also fuse so that the required connection is achieved between the sealing web 412, the films 622, 624 and the self-adhesive layer 18. The self-adhesive layer 18 is applied in a molten state.

It must be noted with respect to the film 624 which is based on polyamide that said film can likewise be designed to be multilayered, and can comprise in particular one or more layers that are based on polyolefin.

The films 622, 624 contain sufficient components to ensure the required adhesion among each other and with the adjoining layers, i.e., the sealing web 412 or the melting adhesive layer 18.

The invention claimed is:

1. An edifice sealing web, comprising a sealing web facing away from the edifice and containing plasticizers, an adjoining barrier layer which extends on the side facing the edifice and is based on mixtures of homopolyamides and/or copolyamides, and a self-adhesive layer containing an oil adjoining the barrier layer directly,
    wherein the barrier layer comprises at least two layers, of which a first layer is a hot melt adhesive layer containing a copolyamide and a second layer is another layer containing a homopolyamide, wherein the first layer is bonded to the sealing web, and wherein the barrier layer prevents migration of the plasticizers from the sealing web and prevents migration of the oil from the self-adhesive layer,
    wherein the surface of the sealing web that is connected to the barrier layer which extends on the side facing the edifice has a roughness with Ra=2.5-10 μm, Rz=20-50 μm, and Rmax=25-65 μm, wherein Rmax=the maximum roughness depth, Ra=the arithmetic mean roughness value, Rz=the averaged roughness depth, and
    wherein the sealing web includes a base polymer, a polymeric softening agent based on an adipic acid polyester or sebacic acid polyester.

2. The edifice sealing web according to claim 1, wherein the sealing web is based on PVC-P (soft PVC).

3. The edifice sealing web according to claim 1, wherein the sealing web is based on PVC-P (soft PVC), containing a polymeric softening agent.

4. The edifice sealing web according to claim 1,
wherein the polyamides in the barrier layer are aliphatic polyamides.

5. The edifice sealing web according to claim 1,
wherein the barrier layer contains at least one of PA6, PA6.6 and PA12.

6. The edifice sealing web according to claim 1,
wherein the second layer containing the homopolyamide is multilayered and comprises at least one layer that is based on polyolefins.

7. The edifice sealing web according to claim 1,
wherein the first layer extends on the sealing web side and is multilayered and comprises at least one layer that is based on polyolefins.

8. The edifice sealing web according to claim 1,
wherein the barrier layer contains
a) 10-95% by weight of a copolyamide that is based on a combination of equimolar quantities of piperazine and a C6-C20 amino substituted dicarboxylic acid,
b) 5-90% by weight of a copolyamide, which contains polyether sequences, and
c) 5-50% by weight of other copolyamides, and 0.5-15% by weight of additives.

9. The edifice sealing web according to claim 1,
wherein the barrier layer contains
a thermoplastic compound containing copolyamide of 70-99%,
a lubricating agent or antiblocking agent of 0 to 30%, and
a foaming or raising agent of 0.2 to 30%.

10. The edifice sealing web according to claim 9, wherein the thermoplastic compound contains 90-99% copolyamide.

11. The edifice sealing web according to claim 9, wherein the barrier layer contains 2-5% lubricating agent or antiblocking agent.

12. The edifice sealing web according to claim 9, wherein the barrier layer contains 0.2-1.0% foaming or raising agent.

13. The edifice sealing web according to claim 1,
wherein the barrier layer is a fused film.

14. The edifice sealing web according to claim 1,
wherein the barrier layer has a thickness $D_B$ that is equal to or greater than 5 μm and equal to or less than 300 μm.

15. The edifice sealing web according to claim 1,
wherein the self-adhesive layer has a thickness $D_S$ that is equal to or greater than 0.5 mm and equal to or less than 1.1 mm.

16. The edifice sealing web according to claim 1,
wherein the sealing web contains at least one material selected from the group consisting of PVC (polyvinyl chloride), TPE (thermoplastic elastomer), TPO (thermoplastic elastomer based on olefin), TPV (thermoplastic vulcanizate), EPDM (ethylene propylene diene rubber), EVA (ethylene vinyl acetate), PP (polypropylene), PE (polyethylene), and PA (polyamide).

17. The edifice sealing web according to claim 1,
wherein the self-adhesive layer contains at least one material selected from the group consisting of bitumen, butyl, SBS (styrene butadiene styrene), SBR (styrene butadiene rubber), acrylate compounds, silane terminated polymers, and polyolefins.

18. The edifice sealing web according to claim 1,
wherein the barrier layer completely covers the surface of the sealing web on the side facing the edifice.

19. The edifice sealing web according to claim 1,
wherein to form a weld edge, a longitudinal edge region of the sealing web is not covered by the barrier layer.

20. The edifice sealing web according to claim 19,
wherein the self-adhesive layer runs at a distance from the edge of the barrier layer, which runs on the side of the weld edge.

21. The edifice sealing web according to claim 1,
wherein the barrier layer covers a weld edge.

22. An edifice sealing web according to claim 1,
wherein independent of the sealing web, the edifice sealing web is free of a layer of reinforcing material.

23. The edifice sealing web according to claim 1, wherein the barrier layer contains,
a thermoplastic compound containing copolyamide of 90-99%,
a lubricating agent or antiblocking agent of 2 to 5%, and
a foaming or raising agent of 0.2 to 1.0%.

24. The edifice sealing web according to claim 1, wherein the barrier layer has a thickness $D_B$ that is equal to or greater than 25 μm and equal to or less than 60 μm.

25. The edifice sealing web according to claim 1, wherein the self-adhesive layer has a thickness $D_S$ that is equal to or greater than 0.7 mm and equal to or less than 0.9 mm.

26. The edifice sealing web according to claim 1, wherein the sealing web further includes monomeric softening agent based on phthalic acid esters.

27. The edifice sealing web according to claim 1, wherein the polymeric softening agent is based on an adipic acid polyester or a sebacic acid polyester with an average molecular weight of 3,000 to 12,000.

28. A process for manufacturing an edifice sealing web according to claim 1, comprising the processing steps of:
manufacturing a sealing web,
affixing a barrier layer that is based on a polyamide or a copolyamide, on one side of the sealing web, and
applying a molten self-adhesive layer to the barrier layer while simultaneously melting or fusing the barrier layer.

29. The process according to claim 28,
wherein the single layer or multilayer barrier layer is in the form of a barrier film and is applied directly to the sealing web and the self-adhesive layer is applied directly to the barrier layer.

30. The process according to claim 29,
wherein to affix the barrier film, said barrier film is heated to a temperature $T_1$ with 60° C. $\leq T_1 \leq$ 80° C.

* * * * *